Sept. 3, 1963  D. E. BLACK  3,102,442
AN ACORN-SHAPED CUTTER BIT
Filed Dec. 11, 1961  3 Sheets-Sheet 2

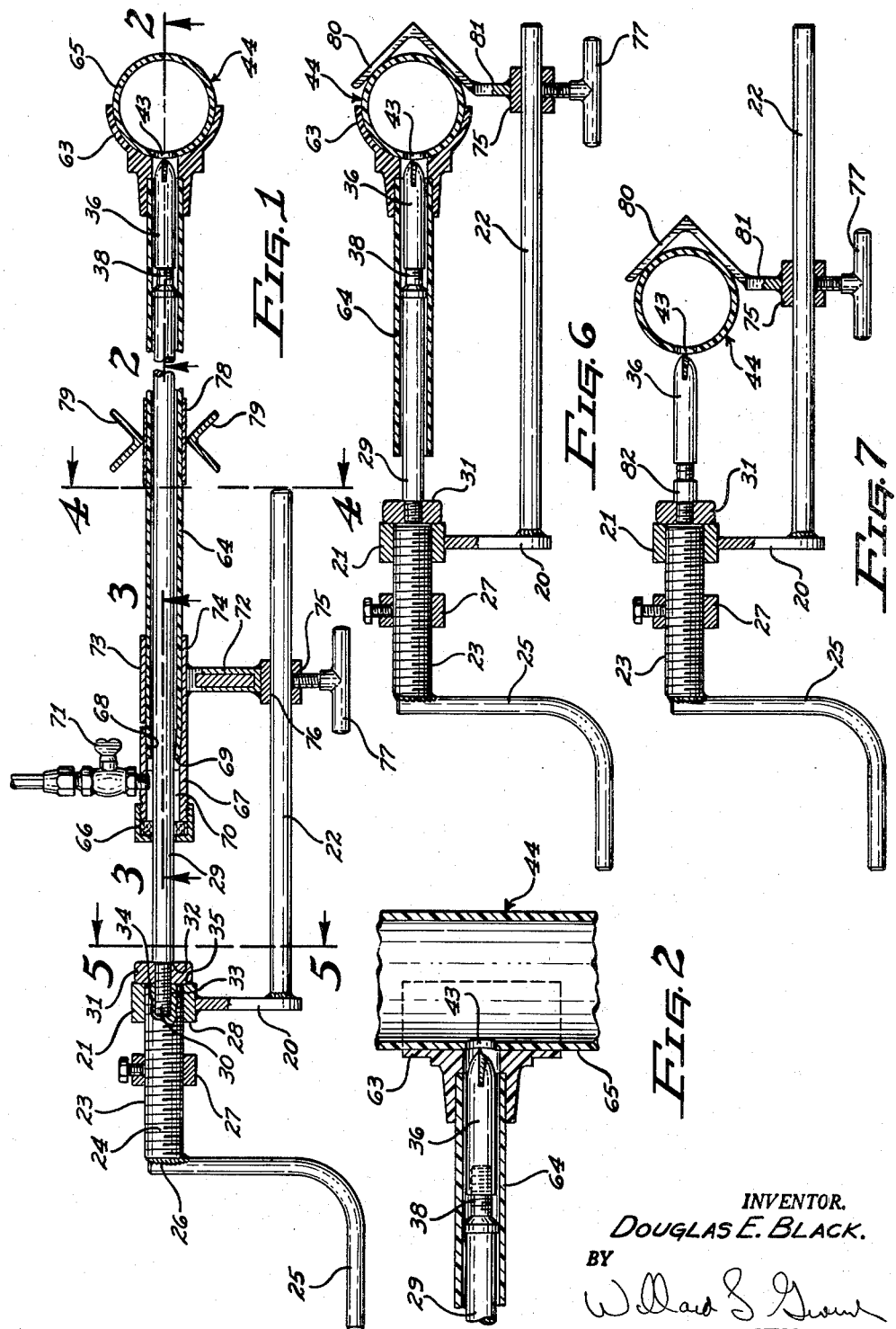

INVENTOR.
DOUGLAS E. BLACK.
BY
ATTORNEY.

Sept. 3, 1963 D. E. BLACK 3,102,442
AN ACORN-SHAPED CUTTER BIT
Filed Dec. 11, 1961 3 Sheets-Sheet 3

INVENTOR.
DOUGLAS E. BLACK.
BY
Willard S. Green
ATTORNEY.

United States Patent Office 3,102,442
Patented Sept. 3, 1963

3,102,442
AN ACORN-SHAPED CUTTER BIT
Douglas E. Black, 2044 W. Palo Verde Drive,
Phoenix, Ariz.
Filed Dec. 11, 1961, Ser. No. 158,454
6 Claims. (Cl. 77—67)

This invention pertains to pipe line tapping apparatus, and is particularly directed to an acorn-shaped cutter bit for tapping a main pipe line and making service connections and the like thereto.

Thermoplastic pipe as a means of utility fuel gas distribution has become widespread in use in recent years because it has proven its practicality and economy. Experience has shown that very few material failures have occurred. However, thermoplastic pipe presents certain new and different problems from that of the heretofore used metal pipe. Shutting off the flow and making satisfactory connections between main line and service lines requires special procedures and apparatus for the efficient, safe and rapid handling of such pipe line installations.

One of the objects of this invention is to provide a highly efficient acorn-shaped cutter bit for tapping main pipe lines and installing service connections thereto.

Another object is to provide a pipe line tapping machine utilizing a specially constructed acorn-shaped cutter bit which operates in connection with the service line take-off saddle of thermoplastic pipe and the like.

A further object of this invention is to provide an acorn-shaped cutter bit which perforates the pipe line without leaving any chips or shearings in the pipe line being perforated.

Still another object of this invention is to provide a pipe line perforating tool utilizing a specially constructed acorn-shaped cutter bit which grips a previously attached saddle and service line take-off pipe and operates therethrough with automatic feed to cold or hot tap the main line to complete the service connection.

Another object is to provide a specially designed acorn-shaped cutter bit for use with the aforementioned apparatus which receives the chips cut from the pipe during the perforating operation within the cutter body from which they may be removed after the tool is withdrawn from the pipe so that no chips get into the pipe line perforated.

It is also an object of this invention to provide an acorn-shaped cutter bit which is supported on the previously attached service line and operates through the service line for the perforation of the main line.

Further features and advantages of this invention will appear from a detailed description of the drawings in which:

FIG. 1 is a side elevation, partly in section, showing a pipe line hot tapping apparatus utilizing an acorn-shaped cutter bit incorporating the features of this invention.

FIG. 2 is an enlarged sectional view on the line 2—2 of FIG. 1.

FIG. 6 is a side elevation, partly in section, showing a pipe line cold tapping apparatus and acorn-shaped cutter bit as shown in FIG. 1.

FIG. 7 is a side elevation partly in section, showing another arrangement of a cold tapping and acorn-shaped cutter bit apparatus.

Figure 3:
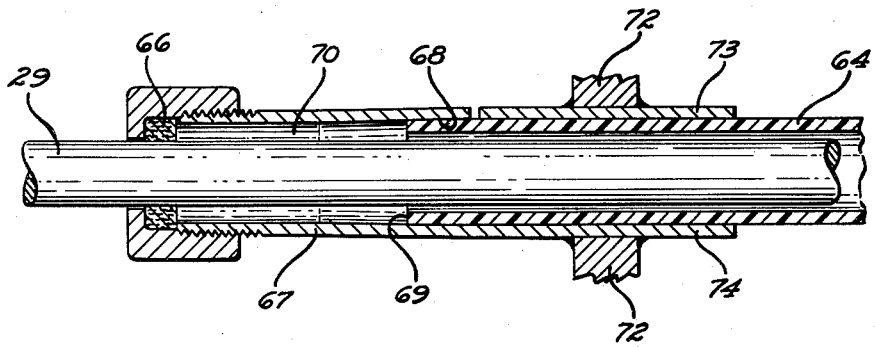
FIG. 3 is an enlarged sectional view on the line 3—3 of FIG. 1.
Figure 4:
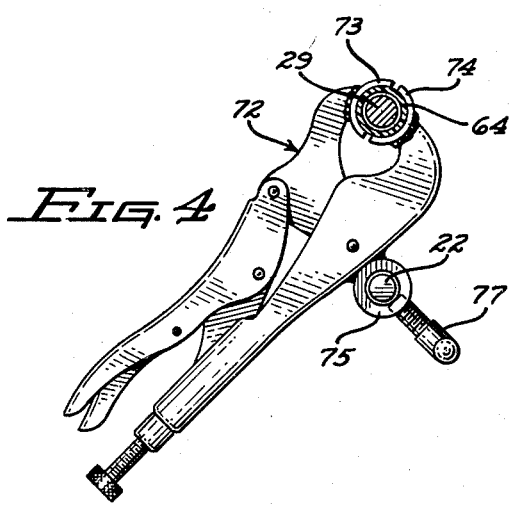
FIG. 4 is an enlarged sectional view on the line 4—4 of FIG. 1.
Figure 5:
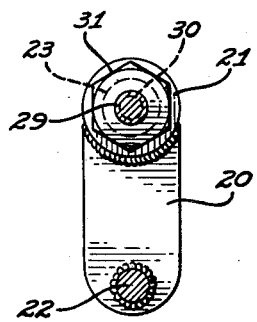
FIG. 5 is an enlarged sectional view on the line 5—5 of FIG. 1.

As an example of one embodiment of this invention there is shown a pipe line tapping apparatus comprising a frame 20 to which is fixed the feed nut 21 and the torque rod 22. A feed screw 23 has threads 24 operatively engaging in the feed nut 21 and has an operating handle 25 fixed to its outer end 26 so that the feed screw 23 may be rotated to cause relative axial movement of the feed screw 23 and nut 21. An adjustable stop collar 27 is threadedly mounted on the feed screw and adapted to engage the abutment surface 28 of the nut 21 to limit relative inward travel of the feed screw 23.

A drill shank 29 has a threaded end 30 upon which is mounted a stop collar 31 which engages the shoulder 32 on the drill shank 29 to lock the stop collar thereon. The threaded end 30 of the shank is received in the mating threaded bore 33 in the inner end 34 of the feed screw 23 and screwed into place with the stop collar tightly abutting against the end 34 of the feed screw. The stop collar 31 has sufficient diameter to engage the abutment surface 35 of the feed nut 21 to limit outward travel of the feed screw and drill shank 29.

Figure 8:
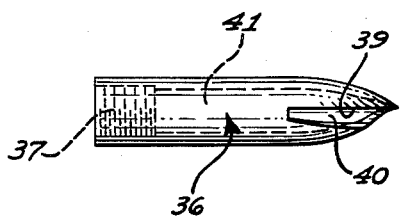
FIG. 8 is a side elevation of a small bore acorn-shaped cutter bit for perforating a pipe line.
Figure 9:
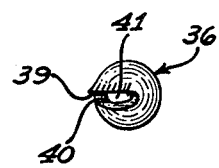
FIG. 9 is a front end view of the acorn-shaped cutter bit of FIG. 8.
Figure 12:
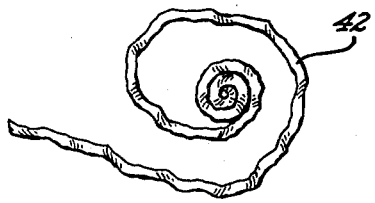
FIG. 12 is a view of the chip or cutting made by the acorn-shaped bits of FIGS. 8 and 10.

A special acorn-shaped cutter bit or tool 36, FIGS. 8 and 9, has a threaded bore 37 by which the cutter bit is mounted on the threaded mating outer end 38. The cutter bit 36 has a cutting edge 39 located adjacent an opening 40 connected with the hollow interior 41 of the cutter bit so that chips 42 cut in tapping the hole 43 in the main pipe line 44 will be caught within the cutter bit and prevented from getting within the main line 44.

Figures 10, 11:
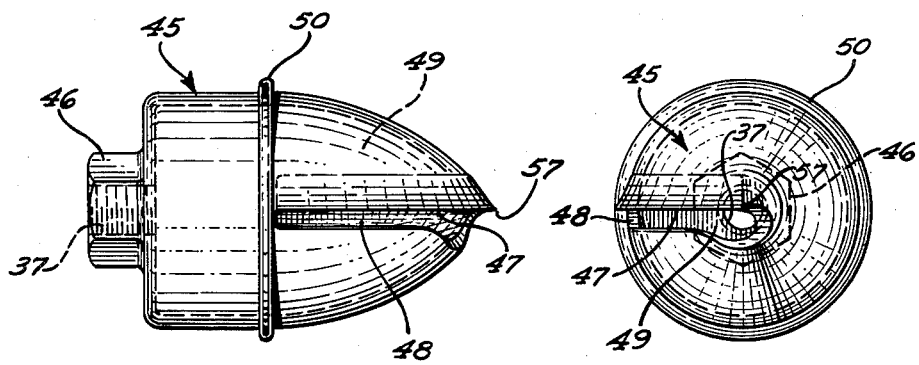
FIG. 10 is a side elevation of a large bore acorn-shaped bit for perforating a pipe line.
FIG. 11 is a front end view of the acorn-shaped cutter bit of FIG. 10.

FIGS. 10 and 11 show a large bore acorn-shaped cutter bit 45 having a suitable mounting hub 46 having a threaded bore 37 adapted to be mounted on the threaded end 38 of the drill shank 29. The cutter bit 45 similarly has a cutting edge 47 adjacent a slot 48 opening into the hollow interior 49 of the cutter bit so that chips coming from the cutting edge 47 enter the hollow interior 49 and are thus trapped so they cannot get into the main line 44. A pressure point 57 provides initial perforation of the pipe. The plastic chips are in long strings formed by the particularly described cutters and can easily be pulled from the cavity 49 at the concluding of the drilling operation. A guide and stop ring 50 is formed on the outside diameter of the cutter to steady the cutter in the service line bore and to limit the inward depth of cut of the cutter bit into the main line pipe to prevent drilling through the other side.

Figure 13:
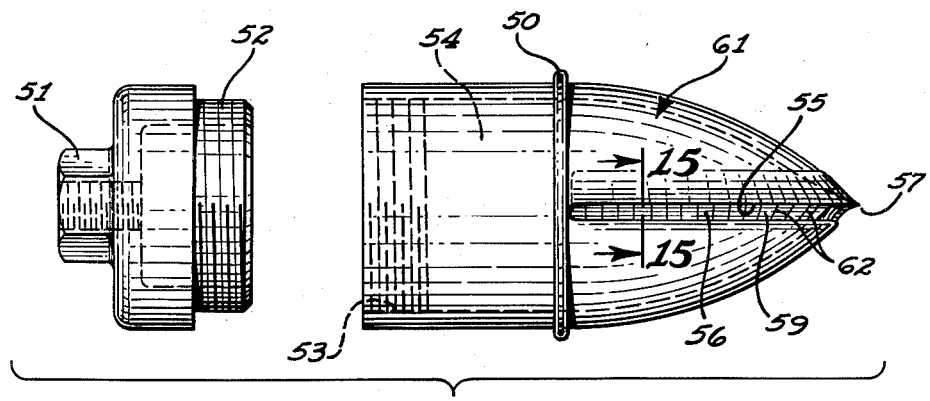
FIG. 13 is an exploded view of a large bore acorn-shaped cutter bit demountable for cleanout and particularly adapted for tapping metal pipes.
Figures 14, 15:
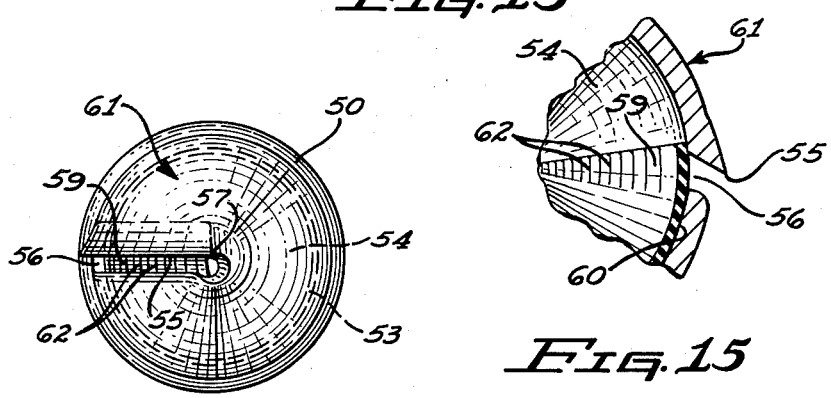
FIGS. 14 is an end elevation of the acorn-shaped cutter bit shown in FIG. 13.
FIG. 15 is an enlarged fragmentary view on the line 15—15 of FIG. 13.

In FIGS. 13, 14 and 15 is a large bore acorn-shaped cutter bit 61 similar to that of FIGS. 10 and 11, but particularly adapted to tapping metal pipe wherein the mounting hub 51 has a threaded portion 52 fitting in the threaded bore 53 of the hollow interior 54 of the cutter bit so that the chips may be easily removed from the hollow interior at the completion of the tapping operation. The cutter is particularly characterized by a radially disposed twist drill type cutting edge 55 adjacent an opening 56 to the interior 54 of the cutter bit and the cutting edge 55 extends rearwardly of the cutter bit, the pressure point 57 taking the high drilling pressure to initially perforate the pipe while the cutting edge 55 opens the pipe perforation to required size. A yielding retaining flap 59 is secured at 60 to the inside surface of the hollow interior 54 adjacent and overlapping the opening 56 of the cutter bit 61. Slits 62 are formed in the flap 59 in the area extending over the opening so that chips coming from the cutting edges 55 and 57 deflect the flap 59 and enter the hollow interior 54 where they are retained from escaping again from the opening 56 by the flap 59.

When hot tapping a main line 44, the service line saddle 63 having a length of service line 64 secured thereto is cemented to the outside diameter 65 of the main line 44 in the customary way. The drill shank 29 is passed through the packing gland 66 of the coupling member 67 which has a slightly tapered bore at 68 which is wedged on the end 69 of the plastic service line 64 to thereby form a sealed pressure chamber 70 connected with the bore of the service line 64 and saddle 63 which is closed off from the main line 44 prior to tapping the same with the cutter bit 36. A stop cock 71 is connected to the chamber 70 and its other end may be connected to a source of pressure for testing the soundness of the saddle connection with the main line 44 before tapping.

The coupling member 67 is rigidly clamped to the outside of the service line by any suitable clamp device 72 having the movable semi-cylindrical jaw 73 and the integral semi-cylindrical portion 74 such as shown in co-pending application Serial Number 78,696 filed December 27, 1960. A clamp cylinder member 75 is rigidly connected to the semi-cylindrical portion 74 through the clamp device 72 and has a bore 76 to slidingly receive the torque rod 22 and a clamp screw 77 to lock the torque rod against sliding movement in said clamp cylinder member 75.

With the parts as shown in FIG. 1, and the clamp screw 77 tightened, the main line may now be tapped by turning the crank 25 which rotates and feeds the acorn-shaped cutter bit to bore the hole 43 into the main line, the chips being retained in the cutter bit as described. As the hole 43 breaks through, pressure enters the service line 64 and the pressure chamber 70. The cutter bit 36 is stopped from cutting through the other side of the pipe 44 by the stop collar 27 engaging the surface 28 of the nut 21. Clamp screw 77 is then loosened and the drill shank 29 pulled back through the packing gland 66, stop cock 71 being closed at this time. The service line 64 is then wrapped with glass tape 78 and pinched off by a suitable pipe squeezer 79 such as shown in the aforementioned copending application. The pipe tapping apparatus and cutter bit may then be released from the service line 64 by opening the clamp device 72. The remaining service line can then be connected to the end 69 and the squeezer 79 released after the pipe has been coupled and patched.

In FIG. 6 is shown the arrangement for cold tapping through the saddle 63 and length of service pipe in which the packing gland 66 and member 67 is not required but a V-rest 80 engages the main pipe line 44 opposite the attached saddle which has an arm 81 fixed to the clamp cylinder member 75 having the clamp screw 77. With the clamp screw 77 tightened rotating hand crank 25 causes cutter bit to perforate the pipe 44 as described.

In FIG. 7 is shown cold tapping the line 44 directly without a saddle similar to FIG. 6 but utlizing a short drill shank 82 for closely mounting the cutter bit 36 on the feed screw 23.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A cutter bit for perforating pipe lines comprising in combination:
   (a) a hollow acorn-shaped body,
   (b) a chip receiving slot formed in said body in communication with said hollow interior of said body,
   (c) a cutting edge on said body adjacent said slot,
   (d) a yielding retaining flap fixed to the interior of said hollow body adjacent said chip receiving slot to allow entrance and cause entrapment of chips discharged from said cutting edge.

2. A cutter bit for perforating pipe lines comprising in combination:
   (a) a hollow acorn-shaped body, adapted to be mounted on a rotatable and axially movable tapping tool,
   (b) a cutting edge on the outside of said body extending from the tip of said cutter in a rearwardly curving involute in a plane passing through the axis of rotation of said cutter bit to the cylindrical outside diameter of said body,
   (c) and an opening adjacent the cutting face of said cutting edge opening inwardly providing the sole access to the hollow interior of said body adapted to receive a continuous chip cut by said cutting edge as said body is rotated and to allow said chip to enter and be trapped within the hollow interior of said acorn-shaped body.

3. A cutter bit for perforating pipe lines comprising in combination:
   (a) a hollow acorn-shaped body having,
   (b) a mounting hub formed on the rear end of said body adapted to be connected to a tapping tool,
   (c) a cutting edge formed on the exterior lying in a plane passing through the axis of rotation of said cutter bit and diameter portion of said body extending radially outwardly in a rearwardly curving involute from the axis of rotation of said body to the full cylindrical diameter thereof,
   (d) a slot formed in said body adjacent said cutting edge adapted to receive a continuous chip cut by said cutting edge and to discharge said chip into the hollow interior of said body,
   (e) and a pressure point at the leading end of said cutting edge located on the axis of said body adapted to initially engage and perforate the pipe line to be tapped.

4. A cutter bit for perforating pipe lines comprising in combination:
   (a) a hollow acorn-shaped body having,
   (b) a mounting hub formed on the rear end of said body adapted to be connected to a tapping tool,
   (c) a cutting edge formed on the involute curved exterior diameter portion of said body extending radially outwardly and rearwardly in a plane passing through the axis of rotation of said cutter bit and from said axis of rotation of said body to the full cylindrical diameter thereof,
   (d) a slot formed in said body adjacent the cutting face of said cutting edge adapted to receive the continuous chip cut by said cutting edge and to discharge said chip into the hollow interior of said acorn-shaped body,
   (e) a pressure point on the axis of rotation of said body at the leading end of said cutting edge adapted to initially engage and perforate the pipe line to be tapped,
   (f) said pressure point and cutting edge being so arranged as to cause a continuous long string chip to develope at said pressure point and progressively move rearwardly along said involute cutting edge during the tapping operation on the pipe line.

5. A cutter bit for perforating pipe lines comprising in combination:
 (a) a hollow acorn-shaped body having,
 (b) a mounting hub formed on the rear end of said body adapted to be connected to a tapping tool,
 (c) a cutting edge formed on the involute curved exterior diameter portion of said body extending radially outwardly and rearwardly in a plane passing through the axis of rotation of said cutter bit and from said axis of rotation of said body to the full cylindrical diameter thereof,
 (d) a slot formed in said body adjacent the cutting face of said cutting edge adapted to receive the continuous chip cut by said cutting edge and to discharge said chip into the hollow interior of said acorn-shaped body,
 (e) a pressure point on the axis of rotation of said body at the leading end of said cutting edge adapted to initially engage and perforate the pipe line to be tapped,
 (f) and a guide and stop ring formed on the rearward outside diameter of said body to steady the cutter within a service line bore and to limit the inward depth and concentricity of cut of the cutter bit into the pipe line being tapped.

6. A cutter bit for perforating a pipe line comprising in combination:
 (a) a hollow acorn-shaped body having a threaded rearward bore,
 (b) a mounting hub adapted to demountably fit in said bore of the hollow interior of said body to provide access to the interior thereof,
 (c) means on said mounting hub to adapt it for mounting on a tapping tool,
 (d) a cutting edge formed on the involute shaped exterior diameter portion of said body extending radially outwardly and curving rearwardly from the axis of said body to the full cylindrical diameter thereof,
 (e) a slot formed in said body adjacent the cutting face of said cutting edge providing the sole access to said body interior adapted to receive the chip cut by said cutting edge and to discharge said chip into said hollow interior of said body,
 (f) and a pressure point on the axis of said body at the leading end of said cutting edge adapted to initially engage and perforate the pipe line to be tapped.

References Cited in the file of this patent

UNITED STATES PATENTS

| | | |
|---|---|---|
| 88,760 | Whitehouse | Apr. 6, 1869 |
| 132,883 | Whitmore | Nov. 5, 1872 |
| 302,292 | Soderstrom | July 22, 1884 |
| 410,863 | Swan | Sept. 10, 1889 |
| 1,065,248 | Hinman | June 17, 1913 |
| 1,294,052 | Clark | Feb. 11, 1919 |
| 1,592,754 | Brackett et al. | July 13, 1926 |
| 2,640,379 | Graves | June 2, 1953 |
| 2,981,127 | Ransom | Apr. 25, 1961 |
| 3,045,511 | Risley | July 24, 1962 |